United States Patent [19]

Fischer

[11] 4,442,672

[45] Apr. 17, 1984

[54] BOOST CONTROL DEVICE FOR INTERNAL COMBUSTION ENGINES WITH EXHAUST GAS TURBOCHARGER

[75] Inventor: Adolf Fischer, Haar, Fed. Rep. of Germany

[73] Assignee: Bayerische Motoren Werke AG, Fed. Rep. of Germany

[21] Appl. No.: 355,591

[22] PCT Filed: Jun. 11, 1981

[86] PCT No.: PCT/EP81/00071

§ 371 Date: Feb. 16, 1982

§ 102(e) Date: Feb. 16, 1982

[87] PCT Pub. No.: WO81/03681

PCT Pub. Date: Dec. 24, 1981

[30] Foreign Application Priority Data

Jun. 14, 1980 [DE] Fed. Rep. of Germany ....... 3022345

[51] Int. Cl.³ ............................................. F02B 37/12
[52] U.S. Cl. ..................................................... 60/602
[58] Field of Search ................. 60/600, 601, 602, 603, 60/611; 123/564

[56] References Cited

U.S. PATENT DOCUMENTS

| 2,374,708 | 5/1945 | Shoults | 60/602 X |
| 2,376,199 | 5/1945 | Shoults | 60/602 X |
| 2,645,409 | 7/1953 | Lawler | 60/600 |
| 4,174,617 | 11/1979 | Jalali-Karchay | 60/602 |
| 4,203,296 | 5/1980 | Tanaka et al. | 60/602 |

FOREIGN PATENT DOCUMENTS

| 622488 | 6/1961 | Canada | 123/564 |
| 2328494 | 1/1975 | Fed. Rep. of Germany | 123/564 |
| 762475 | 1/1934 | France | 60/602 |
| 2369423 | 5/1978 | France | 60/602 |

Primary Examiner—Michael Koczo
Attorney, Agent, or Firm—Craig & Burns

[57] ABSTRACT

A boost control device for an internal combustion engine with an exhaust gas turbocharger includes a bypass valve in a bypass line parallel to an exhaust gas turbine of the exhaust gas turbocharger, a motor operator for the bypass valve which can be loaded in the opening and closing directions by charge air, a control valve which feeds charge air to the motor operator as a function of boost pressure, where the control valve feeds charge air to the motor operator of the bypass valve in the closing direction up to a pre-established boost pressure and this feed can be vented to the environment by the control valve, and a pressure control valve which can be loaded by the charge air in the opening direction. The pressure control valve is loaded in the closing direction by a barometric plug which is exposed to ambient pressure and is prestressed as a function of at least one of the ambient temperature and the charge air temperature.

4 Claims, 1 Drawing Figure

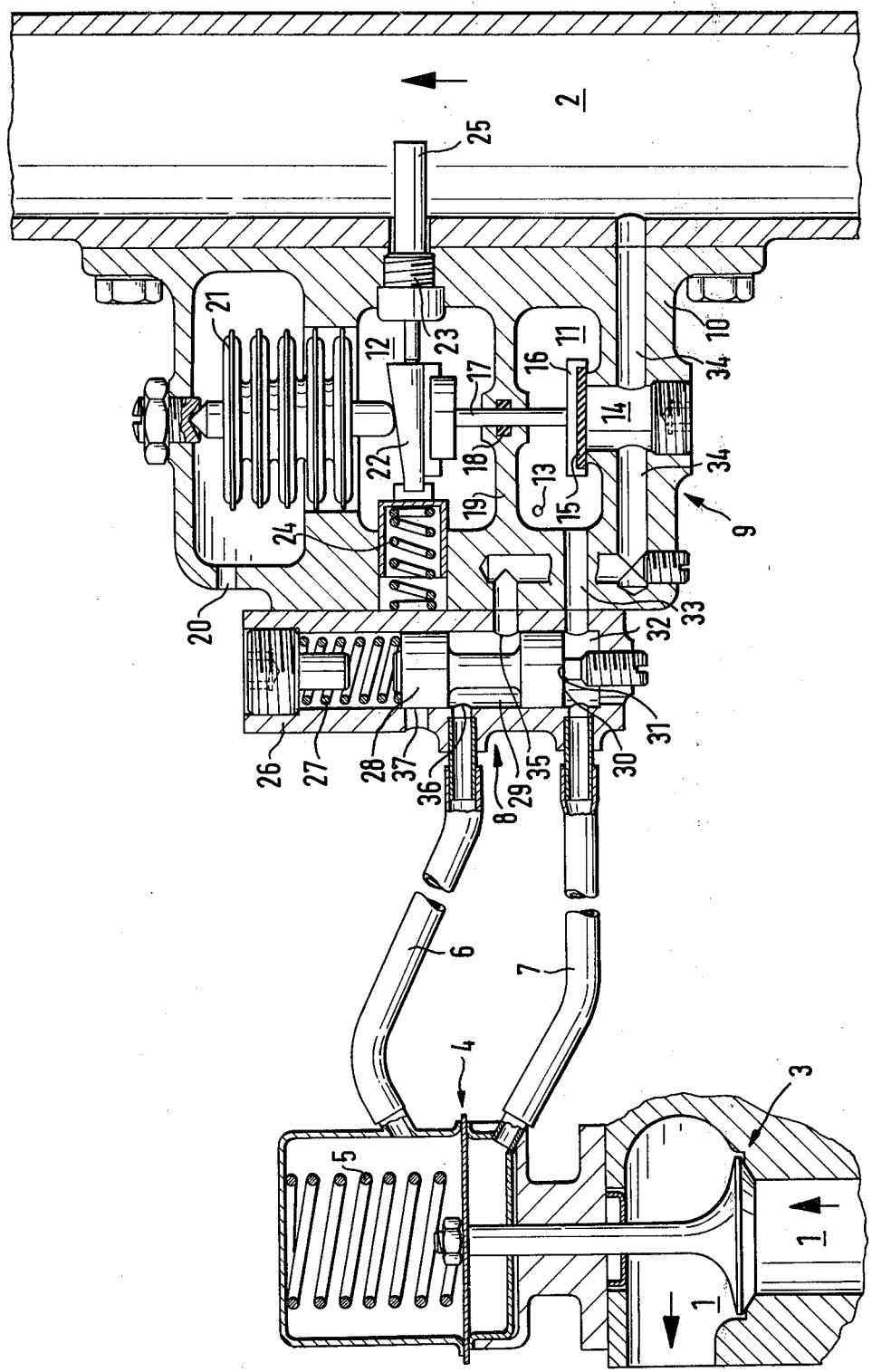

BOOST CONTROL DEVICE FOR INTERNAL COMBUSTION ENGINES WITH EXHAUST GAS TURBOCHARGER

BACKGROUND AND SUMMARY OF THE INVENTION

This invention pertains to a boost control device for internal combustion engines with an exhaust gas turbocharger comprising a bypass valve in a bypass line which is parallel to the exhaust gas turbine of the turbocharger, a motor operator for the bypass valve which can be loaded in the opening and closing directions and a control valve which feeds charge air to the motor operator as a function of temperature and, by means of another motor operator, as a function of boost pressure, in which the control valve feeds charge air to the motor operator of the bypass valve in the closing direction up to a pre-established boost pressure and wherein this feed can be vented into the environment by the control valve.

In a known device of this structure in accordance with DE-OS No. 26 50 033, actuation of the control valve as a function of the engine temerature is ensured by an additional electric motor operator which moves the housing of the control valve relative to its piston slide valve which, in turn, is itself actuated by a motor operator which is loaded with charging air. As the engine temperature rises, the control valve limits to low values the charging air pressure which acts in the direction of the closing of the bypass valve. With rising engine temperatures, this reduces the boost pressure for the engine and its performance as a protection against overload. The boost pressure and thus the engine's output are adjusted to a uniform value which is unaffected by ambient influences such as variations in temperature and air pressure.

An object of the invention is to provide a device of the aforementioned type such that the boost control takes into account changes in the ambient effects and adjusts the charging air pressure and thus the maximum engine output to a uniform value so that the climate and altitude of the site of operation have no effect on the maximum output of the engine.

This and other objects of the invention are attained by providing a boost control device of the aforementioned type with pressure control valve means which is loaded in the opening direction by the charge air, is loaded in the closing direction by means of a barometric plug, and which is exposed to the ambient pressure, and wherein means are provided for prestressing the barometric plug as a function of at least one of the ambient temperature and the charge air temperature.

According to a disclosed preferred embodiment of the invention the means for prestressing the barometric plug as a function of temperature includes an expanding element with a temperature-sensitive part that extends into a charge air line. Further, a wedge is provided in a plane extending transverse to the axis of the barometric plug, the wedge being displaced by the expanding element in opposition to the force of a compression spring.

The pressure control valve means controls a connecting line vented to the environment by a choke opening for the charge air to a motor operator of the control valve means and to the motor operator of the bypass valve in its opening direction. After the pressure control valve means opens, the control valve means blocks and vents to the environment exclusively the closing-direction feed of the charge air to the motor operator of the bypass valve.

These and other objects, features and advantages of the present invention will become more apparent from the following description when taken in connection with the accompanying drawing which shows, for purposes of illustration only, one preferred embodiment in accordance with the present invention.

BRIEF DESCRIPTION OF THE DRAWINGS

The disclosed, preferred embodiment of the invention shown in the drawing features a boost control for internal combustion engines with an exhaust gas turbocharger. For the sake of simplicity, of the latter devices only a part of a bypass line which passes around the exhaust gas turbine and a part of a charge air line are depicted.

DETAILED DESCRIPTION OF THE INVENTION

Referring now to the single drawing FIGURE, a boost control intervenes in a bypass line 1 of an exhaust gas turbine of an exhaust gas turbocharger, not shown, and controls charge air tapped from a charge air line 2 for the purpose of control. In bypass line 1 there is a bypass valve 3 with a motor operator 4 which can be loaded by the charge air in the opening and closing directions. A compression spring 5 in motor operator 4 also acts in the closing direction; this compression spring prevents the bypass valve 3 from opening even when there is an underpressure in the charge air line 2.

The motor operator 4 is loaded via lines 6 and 7 which are connected to the charge air line 2; a control valve 8 and a pressure control valve 9 intervene in lines 6 and 7.

Pressure control valve 9 is flanged with its housing 10 directly to charge air line 2. Housing 10 has a valve chamber 11 and a spring chamber 12. Valve chamber 11 is connected to its environs by means of a throttle opening 13. A valve hole 14 with a valve seat 15, which works together with a valve disk 16, ends in valve chamber 11. A valve bolt 17 of valve disk 16 extends through a seal 18 in a wall 19, which separates chambers 11 and 12, into spring chamber 12 which is connected to the ambient air via a hole 20. A prestressed barometric plug 21 situated in spring chamber 12 acts on valve bolt 17 in the closing direction of pressure control valve 9. The prestressing of barometric plug 21 can be varied by means of a wedge 22 located between the end of valve bolt 17 and barometric plug 21; this wedge can be moved by an expanding element 23 against a pull-back or compression spring 24 by way of increasing the prestressing. The temperature-sensitive part 25 of expanding element 23 extends directly into charge air line 2.

Control valve 8 is attached with its housing 26 directly to pressure control valve 9. The valve has a piston slide valve 28 with a ring-shaped control recess 29; the piston slide valve can be displaced against the force of a pull-back spring 27. The end face 30 of piston slide valve 28 which faces away from pull-back spring 27 serves as a motor operator which can be loaded with charge air and forms the limit for a working chamber 32 adjacent to a stop 31 attached to the housing. The working chamber 32 is connected on the one hand via a channel 33 to the valve chamber 11 of pressure control valve 9 and, on the other hand, is connected via a line 7 to the side of motor operator 4 of bypass valve 3 which can be loaded in the opening direction. Another channel 34 leads from the charge air line into valve hole 14 of pressure control valve 9, and from there to a control opening 35 is housing 26 of control valve 8. A second control opening 36 of control valve 8 is connected via a line 6 to the side of motor operator 4 of bypass valve 3 which works in the closing direction, and a third control opening 37 of control valve 8 opens into the ambient air.

In an end position of control valve 8 when its motor operator is not loaded with charge air, the first and second control openings 35 and 36 of control valve 8 are interconnected via control recess 29 of the piston slide valve 28 so that the charge air acts on bypass valve 3 in the closing direction and holds it closed.

If the charge air rises above a value which is determined by the prestressing of pressure control valve 9, which can be varied as a function of ambient pressure and charge air temperature, pressure control valve 9 will open against the spring force of barometric plug 21. Then charge air will flow into valve chamber 11, from there into the working chamber 32 of control valve 8 and to the side of motor operator 4 of bypass valve 3 which works in the opening direction. In this process, piston slide valve 28 of control valve 8 is displaced against the force of pull-back spring 27 so that the first control opening 35 is closed and via control recess 29 of piston slide valve 28 the second control opening 36 is connected to the third control opening 37. The effect of this is that the side of motor operator 4 of bypass valve 3 which works in the closing direction is vented to the ambient air and only the side of the motor operator which works in the opening direction is loaded with the pressure of the charge air so that bypass valve 3 opens.

A drop in the ambient pressure and/or a rise in the charge air temperature lead to greater prestressing of barometric plug 21 and thus to a higher charging pressure. Thus changes in the environment and operation are compensated for and a maximum engine output which essentially remains constant at all times is achieved.

While I have shown and described only one embodiment in accordance with the present invention, it is understood that the same is not limited thereto, but is susceptible to numerous changes and modifications as known to those as skilled in the art, and I therefore do not wish to be limited to the details shown and described herein, but intend to cover all such changes and modifications as are encompassed by the scope of the appended claims.

I claim:

1. A boost control device for an internal combustion engine with an exhaust gas turbocharger, comprising bypass valve means for controlling charge air flow in a bypass line disposed parallel to an exhaust gas turbine of the exhaust gas turbocharger, operator means for operating the bypass valve means adapted to be selectively loaded in the opening and closing directions by charge air, control valve means for feeding charge air to the motor operator as a function of boost pressure, said control valve means selectively feeding charge air to the operator means of the bypass valve means in the closing direction up to a pre-established boost pressure and venting the charge air to the environment, pressure control valve means for loading by charge air in the opening direction, barometric plug means which is exposed to ambient pressure for loading the pressure control valve means in the closing direction, means for prestressing said barometric plug means in response to at least one of the ambient temperature and the charge air temperature.

2. A boost control device according to claim 1, wherein said means for prestressing the barometric plug means includes an expanding element with a temperature-sensitive part that extends into a charge air line.

3. A boost control device according to claim 2, wherein said means for prestressing the barometric plug means includes a wedge in a plane extending transverse to the axis of the barometric plug means and spring means for opposing movement of said wedge in at least one direction, the wedge being displaced by said expanding element in opposition to the force of said spring means.

4. A boost control device according to claim 1, 2, or 3, wherein said pressure control valve means includes a choke opening for controlling venting of a connecting line adapted to feed charge air to a motor operator of the control valve means and to the operator means of the bypass valve means in its opening direction to the environment, and wherein after said pressure control valve means opens, said control valve means blocks and vents to the environment exclusively the charge air being fed in the closing direction to the operator means of the bypass valve means.

* * * * *